No. 622,083. Patented Mar. 28, 1899.
J. J. RYLANDS.
VALVE.
(Application filed July 27, 1898.)
(No Model.)
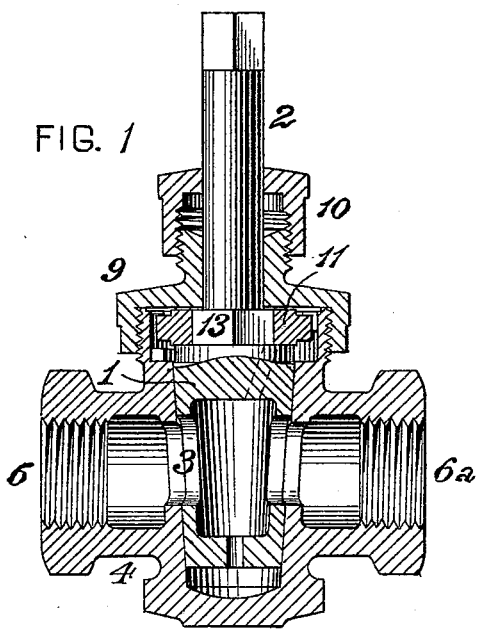
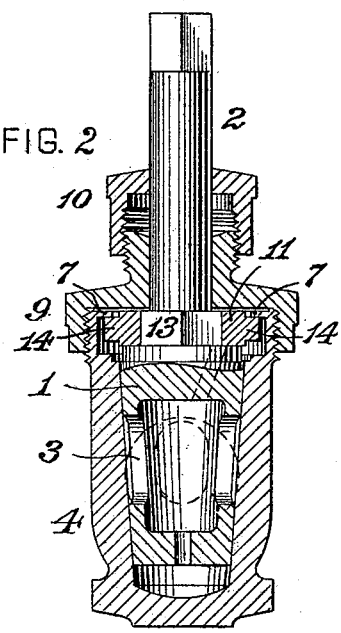
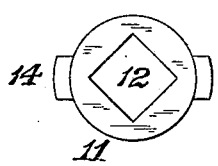
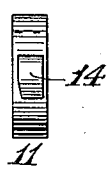
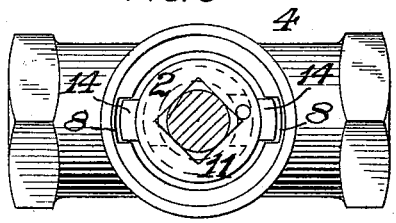
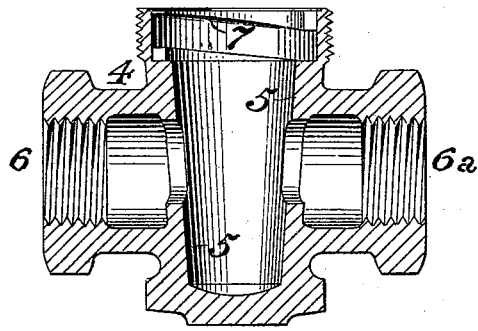
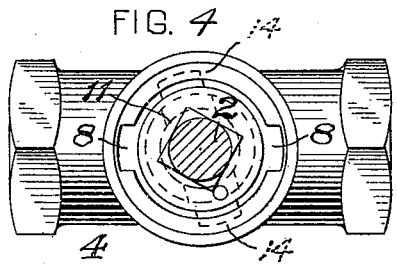
WITNESSES:
James C. Herron.
S. R. Bell.
INVENTOR,
James J. Rylands,
by J. Snowden Bell
Att'y.

UNITED STATES PATENT OFFICE.

JAMES J. RYLANDS, OF HOMESTEAD, PENNSYLVANIA, ASSIGNOR TO THE HOMESTEAD VALVE MANUFACTURING COMPANY, OF SAME PLACE.

VALVE.

SPECIFICATION forming part of Letters Patent No. 622,083, dated March 28, 1899.

Application filed July 27, 1898. Serial No. 687,038. (No model.)

*To all whom it may concern:*

Be it known that I, JAMES J. RYLANDS, of Homestead, in the county of Allegheny and State of Pennsylvania, have invented a certain new and useful Improvement in Valves, of which improvement the following is a specification.

My invention relates to turning plug valves or cocks of the class or type which are provided with accessory means whereby they are locked or held closely to their seats when closed to insure and maintain a tight joint therewith and are released from such engagement to be readily opened by the application of power tending to rotate them to open position.

The object of my invention is to provide a valve which will effectively and practically perform the functions of those of the above type without liability to breakage or derangement of its accessories and will enable a substantial economy of cost of construction and maintenance to be effected.

To this end my invention, generally stated, consists in the combination of a valve, a body in which said valve is fitted to seat and turn, a locking device rotatable with the valve and engaging inclines on the body in the closed position of the valve, and a stop on the body against which the locking device abuts in the open position of the valve.

The improvement claimed is hereinafter fully set forth.

Various constructions of valves or cocks have been proposed and patented prior to my invention in which a valve has been locked or clamped to its seat when closed by the engagement of cam or inclined faces interposed between the valve and the cap of the valve-body, one or one set of the cam members being formed upon the valve or upon a collar interposed between the valve and the cap and the other cam member or members being formed upon the cap or upon a collar bearing thereon. In these cases, so far as my knowledge and information extend, the opposing cam-faces require to be finished or machined, and the presence of the valve-body cap is essential as an abutment for the exertion of wedging or locking action upon the valve. My present invention simplifies and reduces the cost of valves of the locking type exemplified by the constructions above referred to and provides a locking device which requires no fitting or finishing and which properly limits the traverse of the valve in both opening and closing direction.

In the accompanying drawings, Figure 1 is a longitudinal central section through a valve and valve-body embodying my invention, the valve being in open position; Fig. 2, a section taken at right angles to Fig. 1, with the valve in closed position; Figs. 3 and 4, plan views of the valve-body with the cap removed and the valve in open and closed position, respectively; Fig. 5, a longitudinal central section through the valve-body, the valve being removed; and Figs. 6 and 7, plan and side views, respectively, of the locking-collar.

The valve or cock 1 in connection with which my invention is herein shown as applied is in this instance of the tapered plug form, is fixed to a stem 2, provided with a straightway-port 3, and fitted to seat and turn in a valve body or shell 4, having nozzles or connections 6 6$^a$, which may be either threaded, as shown, or flanged for connection with pipes, between which communication is to be controlled by the valve. A seat 5, which is bored in conformity with the valve, is formed in the valve-body 4, above which seat two helical inclines or cam-faces 7 are cored on the valve-body, said inclines extending downwardly on opposite sides of the longitudinal central plane of the valve-body from opposite entrance-recesses 8 therein, one side of each of which forms a shoulder or bearing-face on the valve-body. A cap 9 of the ordinary form is preferably, although not necessarily, connected within the valve and is provided with a suitable stuffing-box or gland 10 for the reception of packing, through which the valve-stem 2 passes. A locking-collar 11, having a central opening 12 with squared or flattened sides, is fitted on and around correspondingly-squared faces 13 on the valve-stem, so as to be rotatable therewith, and is provided with two opposite locking dogs or projections 14, each of which is adapted to pass through one of the entrance-recesses 8 of the valve-body when the valve is in open position and to engage and bear against one of the inclines or cam-faces 7 thereof in and by the movement of the valve toward its closed position. The collar 11 and its dogs 14 may in some constructions be made integral with the valve or valve-stem; but where, as is ordinarily the case, the valve requires to be ground to its seat a separate removable collar, as in the instance shown, should be employed.

In operation when the parts are assembled and the valve is in open position the locking-dogs stand below the entrance-recesses of the valve-body entirely clear of the inclines or cam-faces thereof, and by the bearing of one side of each dog against the adjacent shoulder of a recess the valve is held as against closing movement except in direction to move the dogs away from said shoulders. When moved in this direction, the tops of the locking-dogs bear against and move along the downwardly-extending inclines or cam-faces of the valve-body, and the wedging or clamping action which is thereby exerted locks the valve closely to its seat when it has been moved sufficiently far to fully close it, which will be in less than a quarter of a turn. After the valve has reached such determined position it cannot be moved farther in the same direction; but by the application of power in the opposite direction the bearing of the locking-dogs on the inclines is released and the valve can be readily moved to open position, as required.

It will be obvious to those skilled in the art that my invention is applicable without change of principle or substantial variation of structure to valves having cylindrical instead of tapered bodies, the clamping action in such case being exerted upon a bottom bearing instead of upon a side bearing, as in the instance shown.

It will be seen that under the above construction the locking of the valve is wholly independent of the cap of the valve-body and that the cap may be removed, if desired, when the valve is closed without liability to leakage of fluid or loosening of the valve. A further substantial advantage is attained in economy of construction and maintenance, no machine or hand-work being required upon the inclines of the valve-body or the locking-dogs which bear thereon.

I am aware that a plug-cock carrying a check-valve and a lock-nut, which lock-nut screws into continuous internal threads in the body of the cock in order to lock the same to its seat in the body when the removal of the check-valve is desired, was known in the art prior to my invention, and I do not, therefore, broadly claim the combination, with a valve and its body, of a locking device rotatable with the valve and engaging with the valve-body.

I claim as my invention and desire to secure by Letters Patent—

1. The combination, substantially as set forth, of a valve, a body in which said valve is fitted to seat and turn, a locking device rotatable with the valve and engaging an inclined bearing on the body, in the closed position of the valve, and a stop or shoulder on the body against which the locking device is adapted to abut in the open position of the valve.

2. The combination, substantially as set forth, of a valve, a body in which said valve is fitted to seat and turn, inclines or cam-faces on said body, a locking-collar rotatable with the valve and provided with lateral locking-dogs engaging the inclines of the body, in the closed position of the valve, and stops or shoulders on the body acting as abutments for the locking-dogs in the open position of the valve.

3. The combination, substantially as set forth, of a valve, a valve-stem fixed thereto, a body in which said valve is fitted to seat and turn, inclines or cam-faces on said body, a removable locking-collar fitting on and rotatable with the valve-stem, locking-dogs fixed to said collar and engaging the inclines of the body, in the closed position of the valve, and stops or shoulders on the body against which the locking-dogs are adapted to abut in the open position of the valve.

4. The combination, substantially as set forth, of a valve, a body in which said valve is fitted to seat and turn, inclines or cam-faces on said body, each extending downwardly from a shouldered entrance-recess thereon, and a locking-collar rotatable with the valve and provided with lateral locking-dogs adapted to bear on the shoulders of the entrance-recesses when the valve is open, and to engage the inclines in and by the closing movement of the valve.

5. The combination, substantially as set forth, of a tapered plug-valve, a valve-body in which said valve is fitted to seat and turn, helical inclines formed in said body above the valve-seat, entrance-recesses in the valve-body, each having a shoulder opposite the upper end of one of the inclines, a valve-stem fixed to the valve, a locking-collar fitting squared faces on the valve-stem, and locking-dogs fixed to said collar and adapted to fit in and bear on the shoulders of the entrance-recesses when the valve is open, and to engage the inclines in and by the closing movement of the valve.

JAMES J. RYLANDS.

Witnesses:
J. SNOWDEN BELL,
JAMES C. HERRON.